(12) United States Patent
Yu et al.

(10) Patent No.: US 6,829,754 B1
(45) Date of Patent: Dec. 7, 2004

(54) METHOD AND SYSTEM FOR CHECKING FOR POWER ERRORS IN ASIC DESIGNS

(75) Inventors: Qiong J. Yu, San Jose, CA (US); Radoslav M. Ratchkov, Santa Clara, CA (US); Bo Shen, Fremont, CA (US); Prasad Subbarao, San Jose, CA (US); Thomas M. Antisseril, Newark, CA (US); Charutosh Dixit, Sunnyvale, CA (US); Julie L. Beatty, Campbell, CA (US)

(73) Assignee: LSI Logic Corporation, Milpitas, CA (US)

( * ) Notice: Subject to any disclaimer, the term of this patent is extended or adjusted under 35 U.S.C. 154(b) by 282 days.

(21) Appl. No.: 10/163,208

(22) Filed: Jun. 4, 2002

(51) Int. Cl.[7] ............................................... G06F 17/50
(52) U.S. Cl. ........................................... 716/5; 707/102
(58) Field of Search ......................... 716/1, 5; 707/102

(56) References Cited

U.S. PATENT DOCUMENTS 6,516,446 B2 * 2/2003 Anzai ............................. 716/1
6,532,439 B2 * 3/2003 Anderson et al. ............. 703/14
6,615,394 B2 * 9/2003 Ogawa et al. .................. 716/5
6,675,363 B1 * 1/2004 Oleksinski ...................... 716/4

* cited by examiner

Primary Examiner—Stacy A. Whitmore
(74) Attorney, Agent, or Firm—Sawyer Law Group LLP

(57) ABSTRACT

A method for checking power errors in an ASIC design is disclosed. The method includes providing a power checker software program with one or more power checker modules that each check a particular type of power element in the ASIC design. A power checker database is created that stores the following: individual power elements in the ASIC design, a connectivity graph of the power elements, and location bins corresponding to physical areas in ASIC design that identify the power elements that are located within each area. The method further includes providing a user with a choice of which power elements in the design to check, and executing the power checker modules corresponding to the selected power elements in order to check for errors in the selected power elements. Finally, any detected errors are output for the user.

60 Claims, 10 Drawing Sheets

Power Checker 100

ASIC Design Flow

Power Checker Rules

| Rule# | Name | Status | Description |
|---|---|---|---|
| 1.1 | Macro_Connect | Error | Macro Strap in not connected to anything. |
| 1.2 | Macro_Self_Connect | Error | Macro Straps Connected to each other. |
| 1.3 | Macro_StdCell_Connect | Error | Macro Straps Connected to Standard cells. |
| 1.4 | Macro_Connect | Error | Macro Pin has no net assigned to it. |
| 1.5 | Macro_Connect | Error | Macro Pin is unconnected. |
| 1.6 | Macro_Strap | Error | Straps are routed to an object with no attributes |
| 1.7 | Macro_Strap | Error | Strap width is less than pin width. |
| 1.8 | Macro_Strap | Warning | Strap are too long. |
| 1.9 | Macro_Connect | Error | Macro Strap connects to an object of unexpected type |
| 2.1 | Mesh | Fatal-Error | No vertical mesh exist in the design |
| 2.2 | Mesh | Fatal_Error | No Horizontal Mesh exist in the design. |
| 2.3 | Mesh | Fatal_Error | No Mesh exist in the design |
| 2.4 | Mesh | Error | Mesh is not on the correct layer. |
| 2.5 | Mesh | Error | Mesh width is incorrect for the given current |
| 2.6 | Mesh | Error | Mesh pitch is non-uniform or mesh elements are missing |
| 2.7 | Mesh | Error | InCorrect Mesh Termination.mesh does not terminate at a core ring or I-ring or does not terminate as a pin(hierarchical block.) |
| 2.8 | Mesh | Error | Mesh does not terminate properly |
| 2.9 | Mesh | Warning | Mesh width is not checked at block level |
| 3.1 | Pad_Strap | Fatal_Error | No Pad Straps exist in the design. |
| 3.2 | Pad_Strap | Error | Pad Strap is not fully extended |
| 3.3 | Pad_Strap | Error | Pad Strap has metal layers missing. |
| 3.4 | Pad_Strap | Error | No Pad Strap exist for the Power IO Cell. |

FIG. 10

| 4.1 | Slot_Strap | Fatal_Error | No Slot Straps exist in the design. |
|---|---|---|---|
| 4.2 | Slot_Strap | Error | Slot Strap has metal layers missing for pin on Power or dummy IO cell |
| 4.3 | Slot_Strap | Error | No Slot Strap exist for the Power IO Cell |
| 4.4 | Slot_strap | Warning | Slot Strap missing for the non-power IO cell |
| 4.5 | Slot_strap | Error | Slot Strap is not fully extended for the Power IO cell |
| 4.6 | Slot_Strap | Error | Slot Strap is not fully extended for non-Power IO Cells. |
| 4.7 | Slot_Strap | Warning | Missing balancing slot strap |
| 4.8 | Slot_Strap | Error | Slot Strap has metal layers missing for pin on IO cell |
| 5.1 | Std_Cell_Error | Fatal_Error | No Std Cell Pwr/Gnd Rail exist in the design. |
| 5.2 | Std_Cell_Error | Error | No Std Cell Rails on Std Cell Pwr/Gnd pins. |
| 5.3 | Std_Cell_Error | Error | Std Cell Rail not connected to the Mesh or Bridge, Core Ring, Iring, Std Cell Pin, M1 rail, Top Level Hardmac Pin(hierarchical) |
| 5.4 | Std_Cell_Error | Error | Std Cell Rail does not connect to Mesh at intersection |
| 5.5 | Std_Cell_Error | Error | Std Cell Rail does not connect to any objects |
| 6.1 | Via_Std_Cell | Error | number of Vias less than the minimum recommended for the standard cell rail. |
| 6.2 | Via_macro_straps | Error | Insufficient vias at the strap connection. |
| 6.3 | Via_General | Error | The Wire intersection is not fully populated with Vias. |
| 6.4 | Via_Stack_Error | Error | Intermediate Via's missing in the Stacked Via Group. |
| 6.5 | Via_Error | Error | No Via's exist in the intersection. |
| 7.1 | Short | Error | Pwr/Gnd Short exists. |
| 8.1 | Core_Ring | Fatal | No Core Ring exists in the dsign |
| 8.2 | Core_Ring | Error | Core Ring segments missing |
| 8.3 | Core_Ring | Error | Core Ring width less than what is required. |
| 8.4 | Core_Ring | Error | Core Ring in incorrect metal layers |
| 8.5 | Core_Ring | Warning | Core Ring connected to the R layer for the flipchip design. |
| 9.1 | Float | Fatal | Power object floating. |
| 10.1 | FlipChip | Fatal | No R Later exist for the flipchip design |
| 10.2 | Flipchip | Error | The R Layer does not connect to the IO Core Ring |
| 11.1 | Bridge | Error | Bridge not connected to the mesh |
| 11.2 | Bridge | Error | Insufficient vias at bridge rail intersection. |
| 12.1 | Off-Grid | Error | Macro has off grid pins. |

FIG. 10 Continued

METHOD AND SYSTEM FOR CHECKING FOR POWER ERRORS IN ASIC DESIGNS

FIELD OF THE INVENTION

The present invention relates to ASIC design methodologies, and more particularly to a method for discovering power errors in ASIC designs during the design phase.

BACKGROUND OF THE INVENTION

An application specific integrated circuit (ASIC) is a chip that is custom designed for a specific application, rather than a general-purpose chip such as a microprocessor. An ASIC chip performs an electronic operation as fast as it is possible to do so, providing, of course, that the circuit design is efficiently architected. One area of concern during fabrication is whether the power distribution system is designed correctly.

FIG. 1 is a block diagram illustrating a basic design flow for fabricating an ASIC. The design flow includes a front-end design process that creates a logical design for the ASIC, and a backend design process that creates a physical design for the ASIC. The front-end design process begins with providing a design entry 10 for an electronic circuit that is used to generate a high-level electronic circuit description, which is typically written in a Hardware Description Language (HDL) 12.

Interconnect data from previous designs are used to generate interconnect statistical data to use as the estimation of the physical properties for the interconnects in step 14. The interconnect statistical data is used to create a wire load model 16, which defines the resistance, capacitance, and the area of all nets in the design. The statistically generated wire load model 16 is used to estimate the wire lengths in the design and define how net delays are computed.

The HDL 12 and the wire load model 16 are then input into a logic synthesis tool 18 to generate a list of logic gates and their interconnections, called a layout database or "netlist" 20. Next, system partitioning is performed in step 22 in which the physical design is partitioned to define groupings of cells small enough to be timed accurately with wire load models 16 (local nets). The resulting design typically includes many cells with many interconnect paths, with many having large fanins and fanouts. A prelayout simulation is then performed in step 24 with successive refinement to the design entry 10 and to logic synthesis 18 to determine if the design functions properly.

After prelayout simulation 24 is satisfactory, the backend design process begins with floorplanning in step 26 in which the blocks of the netlist 20 are arranged on the chip. The location of the cells in the blocks are then determined during a placement process in step 28. A routing process makes connections between cells and blocks in step 30. Thereafter, circuit extraction determines the resistance and capacitance of the interconnects in step 32. A postlayout simulation is then performed in step 34 with successive refinement to floorplanning 26 as necessary.

Although the physical knowledge of previous designs are incorporated early in the design flow, many design errors can occur, including the design of the power distribution structures. There are commercially available power tools for carrying out power analysis, but these tools are capable of only transistor and gate level analysis and are designed for use in the late stages of the design after the power structures are completed. Performing such low-level structural analysis late in the design phase can result in many post-layout design iterations to obtain correct power distribution in the finished logical and physical design. These additional design loops can add weeks or months to a project schedule and significantly increase the cost of the design.

Accordingly, what is needed is a tool for performing high-level structural analysis on ASIC designs to ensure that power design rules are adhered to so that power related problems can be avoided during the design flow. The present invention addresses such a need.

SUMMARY OF THE INVENTION

The present invention provides a method for checking power errors in an ASIC design. The method includes providing a power checker software program that has one or more power checker modules, where each module checks a particular type of power element in the ASIC design. A power checker database is also created that stores the following: individual power elements in the ASIC design, a connectivity graph of the power elements, and location bins corresponding to physical areas in ASIC design that identify the power elements that are located within each area. The method further includes providing a user with a choice of which power elements in the design to check, and executing the power checker modules corresponding to the selected power elements in order to check for errors in the selected power elements. Any detected errors are output for the user.

According to the system and method disclosed herein, the present invention provides a software tool can be used at any stage of power planning to check that the power rules are followed for the power elements. This enables power errors to be detected earlier in the design flow. Consequently, the number post-layout iterations required will be minimized, thereby reducing the cost of the design.

BRIEF DESCRIPTION OF THE DRAWINGS

FIG. 10 is a table showing an example set of power design rules upon which the power checker modules of the present invention may be derived.

DETAILED DESCRIPTION

The present invention relates to a method for detecting power errors in ASIC designs. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown but is to be accorded the widest scope consistent with the principles and features described herein.

Figure 1:
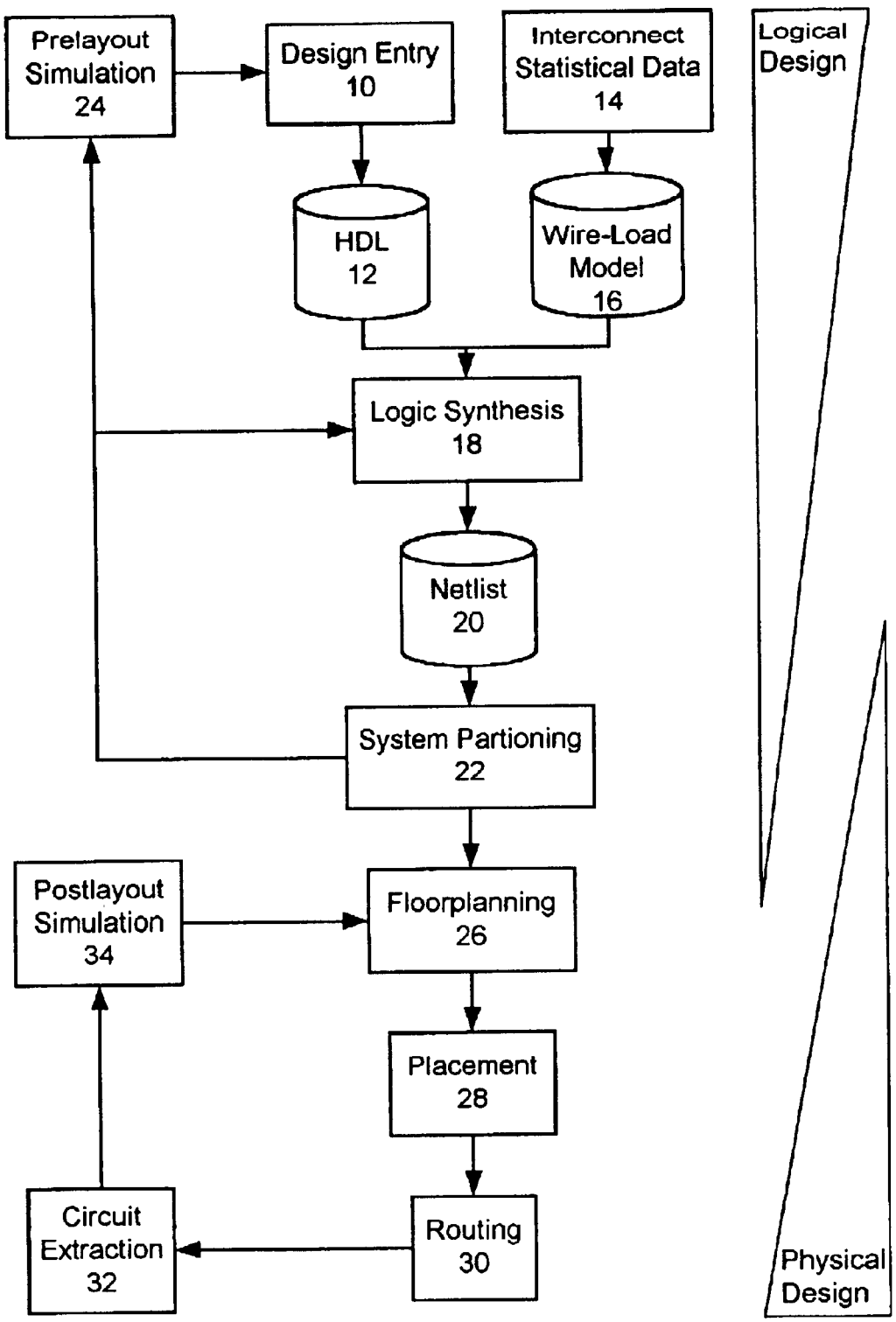
FIG. 1 is a block diagram illustrating a basic design flow for fabricating an ASIC.
Figure 2:
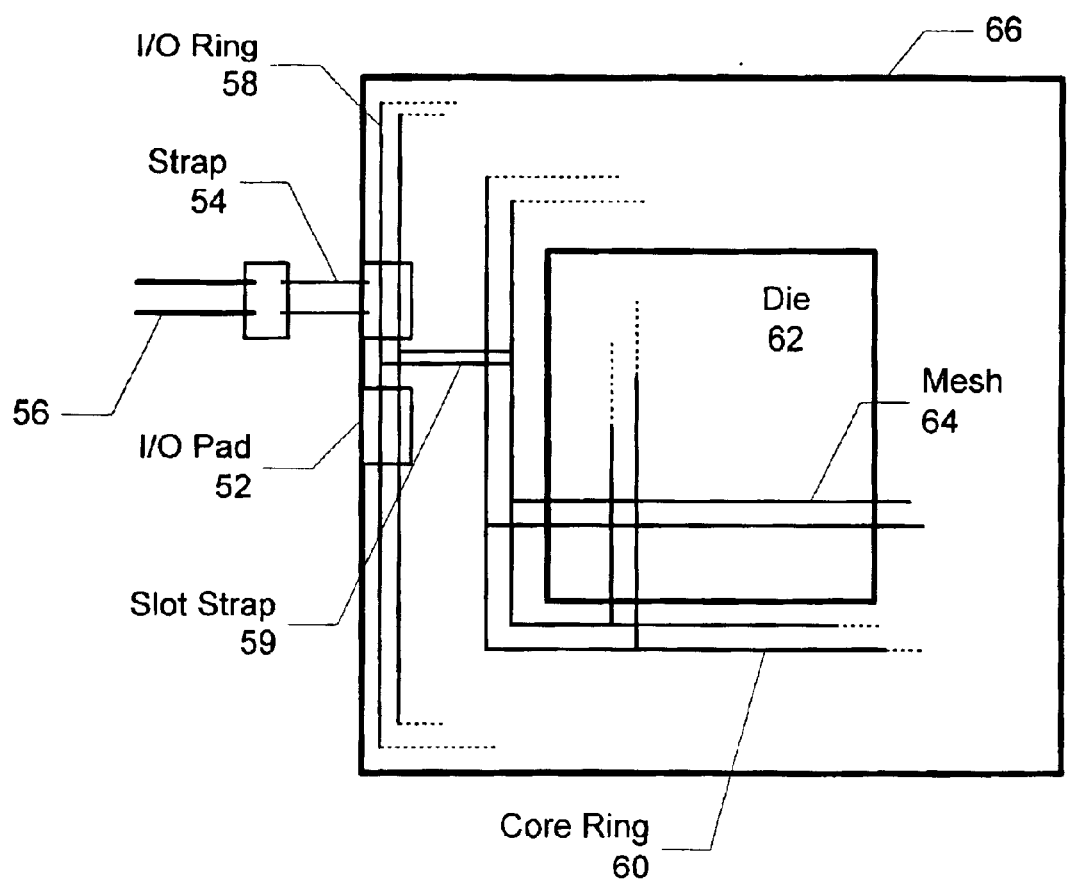
FIG. 2 is a diagram illustrating an example ASIC power distribution system for a wire-bond ASIC design.

An ASIC typically has an advanced power distribution system having different types of power elements. FIG. 2 is a diagram illustrating an example ASIC power distribution system for a wire-bond ASIC design. The ASIC 50 typically includes a die 62 mounted on a substrate 66 with I/O pads 52 along the edges of the substrate 66 connecting the die 62 to an external power source 56 through wire bonds, called flow straps 54. I/O rings 58 connect the I/O pads to core rings 60 that surround the die 62 for supplying power to the die 62. Slot straps 59 connect the I/O pads 52 and the core rings 60. A power mesh 64 distributes the power from the core ring 60 to the cells in the core region of the die 62. In addition, pad straps (not shown) ake a connection between bonding pads (not shown) an dthe I/O ring 58. During fabrication of the ASIC 50, a low-level power analysis may be performed late in the design or fabrication stages to verify the correctness of the power distribution system. Finding errors this late in the process, however, can be expensive to correct.

The present invention provides a software tool, referred to as the power checker, for allowing an operator to check for power errors in ASIC designs during the design phase. This tool checks the physical properties and connectivity of the power structures to ensure that basic design power rules are adhered to. It's purpose is to detect errors in the power grid in as early stages of the layout as possible, thus eliminating failures due to incorrectly built power grid. In one aspect of the invention, the tool can be used to run either a complete power system check, or only run power checks on specified elements right after after they are built, such as checking slot straps, for example. The tool can also be used at any stage of power planning to check that the power rules are followed for the power elements. For example, the power checker can be run to check for correct pitch, width and connectivity of a power mesh immediately after the power mesh is designed. Therefore, the tool can catch any power errors early on in the design flow. In addition, the tool is very fast and can handle either flat designs or hierarchical designs. Another aspect of the tool is the ability to graphically display the location of errors to help users to debug the errors easily.

Figure 3:
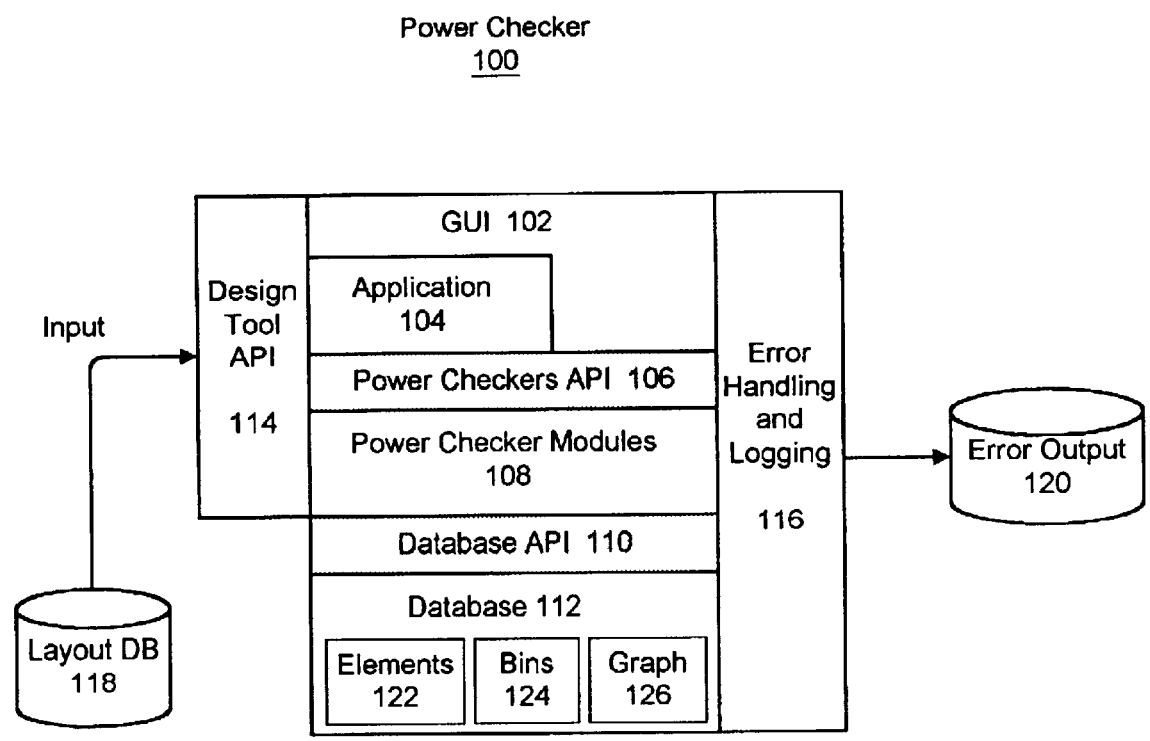
FIG. 3 is a block diagram illustrating components of the power checker software program in a preferred embodiment of the present invention.

FIG. 3 is a block diagram illustrating components of the power checker software program in a preferred embodiment of the present invention. In a preferred embodiment, the power checker program 100 is design to run on a conventional UNIX-based workstation (not shown), although any type of PC or mainframe could also be used. In a further embodiment, the power checker program 100 could be provided as a web application on a web server and accessed over a LAN or public network, such as the Internet. The power checker program 100 includes a graphical user interface (GUI) 102, a power checker application 104, a power checker API 106, one more power checker modules 108, a database API 110, a database 112, a design tool API 114, and an error handling and logging module 116.

The power checker program 100 runs in conjunction with a basic design tool (not shown), which interfaces with power checker program 100 through the design tool API 114. The input to power checker program 100 is technical data for an ASIC design, which it typically stored in a layout database 118 and loaded into the power checker program 100 through the design tool API 114. The type of technical data that it to be transferred in includes the number of power elements in the design, the names of the power elements, design spacing, and so on. The layout database 118 may also include a net list that specifies the number of cells, interconnects, and vias, the length of each interconnect, the length of each interconnect between each pair of vias, and fanout data for each net.

The power checker application 104 is responsible for running the appropriate power checker modules 108 based on user input. When first invoked, the power checker application 104 displays the GUI 102 to allow an operator to specify which type of power elements are to be checked. Each of the power checker modules 108 run algorithms to analyze particular types power elements in order to check for errors in the ASIC design. The power checker API 106 allows additional power checker modules 108 to be added to system in the future.

According to one aspect of the present invention, the power checker modules 108 operate on data that is specially stored the database 112 to provide fast access to each power element 122 in a given design and well as to connectivity data regarding which power elements 122 are connected to which power elements 122 in the design. The database 112 is generated from the input layout database 118, explained further below.

The error handling and logging module 116 is responsible for generating the output of the power checker program 100. The outputs of the power check program 100 may include a graphical representation of the errors found in the ASIC design, a text error file containing a record of all errors found in the design, and a log file of the errors. The errors are preferably generated by each of the power checker modules 108 when executed. In a preferred embodiment, the log file is stored in a predefined syntax to allow parsing of the log file by external tools.

Figure 4:
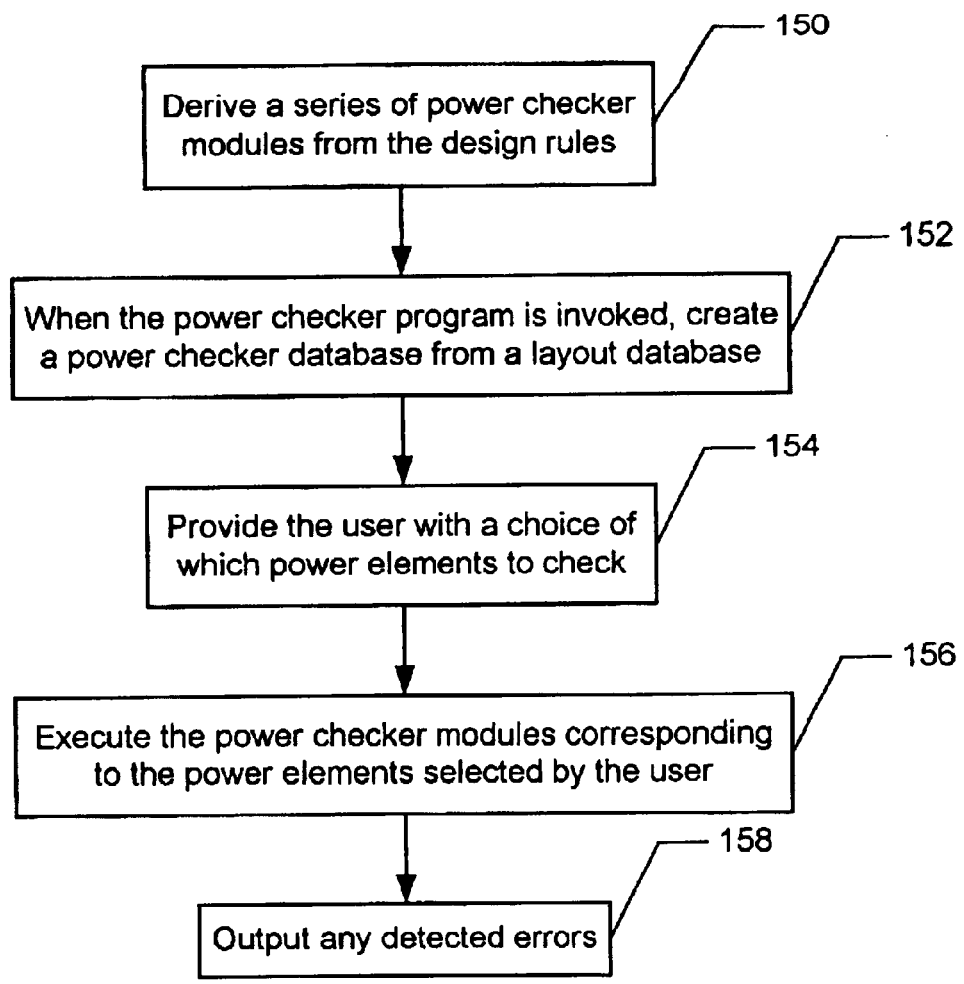
FIG. 4 is a flow chart illustrating a process for implementing the power checker program in order to check for power errors in ASIC design in a preferred embodiment of the present invention.

FIG. 4 is a flow chart illustrating a process for implementing the power checker program 100 in order to check for power errors in ASIC design in a preferred embodiment of the present invention. The process begins in step 150 by deriving a series of power checker modules 108 from the design rules that are used to generate the ASIC design, and incorporating the power checker modules 108 into the power checker program 100. In a preferred embodiment, each of the power checker modules 108 analyzes a particular type of power element 122.

In one aspect of the present invention, the database 112 is kept independent of the physical layout design database 118. When the power checker program 100 is invoked, the database 112 is created in step 152 from the layout database 118. As shown in FIG. 3, and in accordance to the present invention, the database 112 stores multiple types of information: 1) data regarding the physical properties of each power element 122 in the ASIC design, 2) location bins 126 corresponding to physical areas in the ASIC design that identify which power elements 122 are located within each area, and 3) a connectivity graph 124 indicating which power elements 122 are connected to which other power elements 122.

Figure 5:
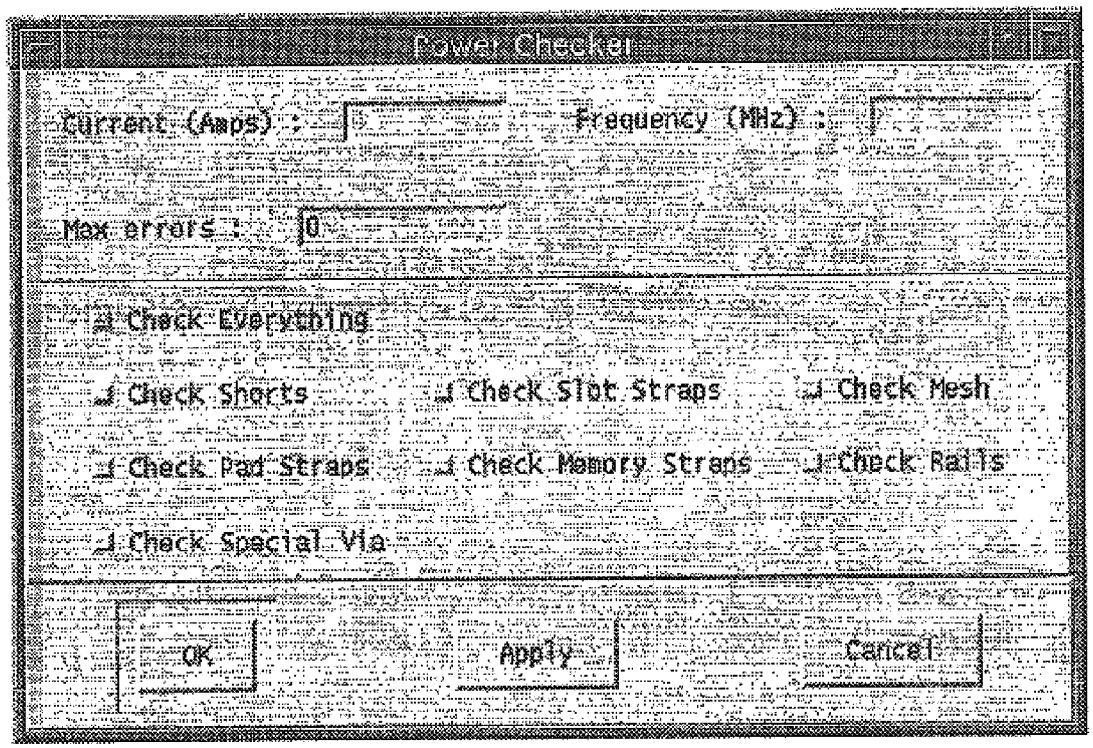
FIG. 5 is a diagram illustrating an example screen displayed by the power checker program that allows the user to select which power elements are to be analyzed by the program.

Referring again to FIG. 4, once the program 100 is invoked, in step 154, the GUI 102 provides the user with a choice of which power elements to check, preferably by displaying a fist of available power checks from which the user may choose. FIG. 5 is a diagram illustrating an example screen displayed by the power checker program 100 that allows the user to select which power elements are to be analyzed by the program 100. Prior to running the power checker, the user must specify a value for the current (Amps) and frequency (Mhz) used in the design so that the correct calculations may be made.

According to the present invention, the user can instruct the power checker program 100 to analyze the various types power elements 122 either incrementally after each type of power element is designed, or in batch after all the power elements are complete. The user may select either "Check All", or any combination of the following: "Check Shorts", "Check Slot Straps", "Check Mesh", Check Pad Straps", "Check Memory Straps", Check Rails", or Check Via".

Referring again to FIG. 4, in step 156, the power checker modules 108 corresponding to the power elements selected by the user are executed to check for errors in the selected power elements 122.

Figure 6:
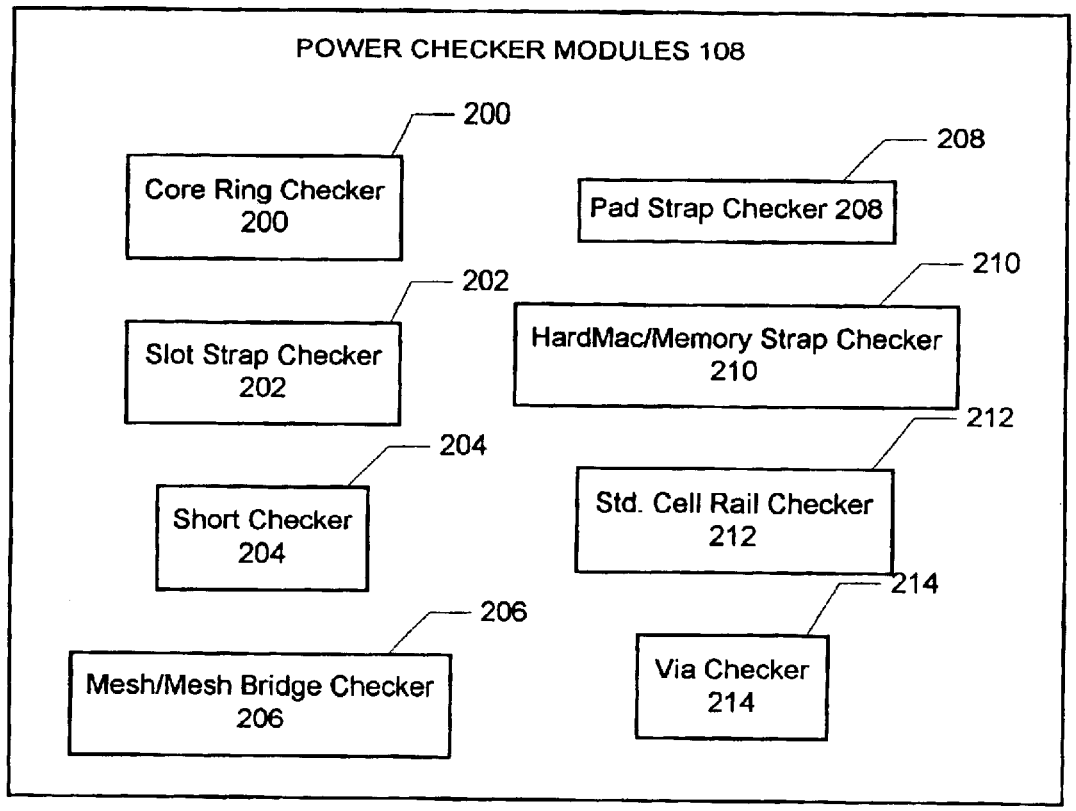
FIG. 6 is a block diagram illustrating an example set of power checker modules that may be included in the power checker program.

FIG. 6 is a block diagram illustrating an example set of power checker modules 108 that may be included in the power checker program 100. In a preferred embodiment, the power checker program 100 includes a core ring checker 200, a slot strap checker 202, a short checker 204, a mesh checker 206, a pad strap checker 208, a memory straps checker 210, a standard cell rail checker 212, and a via checker 214. The function, operation, and error output of each of the power checker modules 108 are described further below.

Referring again to FIG. 4, in step 158, as the power checker modules 108 complete execution, any detected errors are outputted from the power checker program 100 and displayed to the user on a monitor or printed report.

Figure 7:
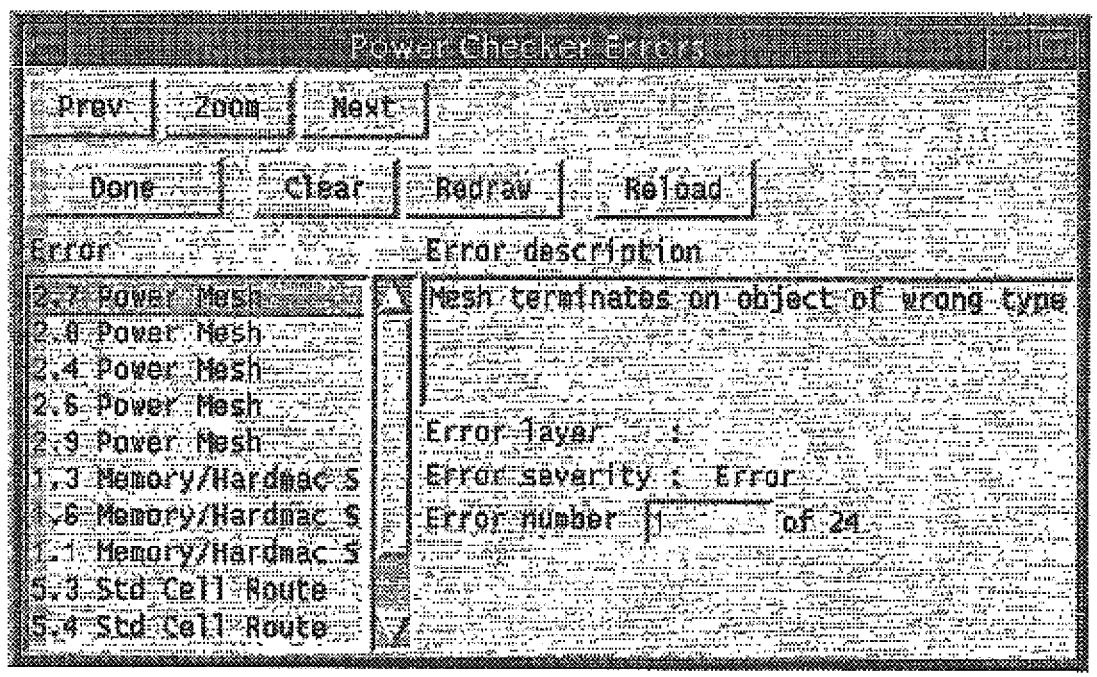
FIG. 7 is a diagram illustrating an example error screen displayed by the power checker program after the power checker modules have completed execution.

FIG. 7 is a diagram illustrating an example error screen displayed by the power checker program 100 after the power checker modules 108 have completed execution. The error screen displays a scrollable list of the errors and warnings issued by the power checker modules 108. A description is given for the currently selected error as well as the severity. In a preferred embodiment, the errors may also be displayed graphically to visually aid the user in finding errors physically on the chip, and the user is able to zoom, clear, reload, and redraw the image. In a preferred embodiment, the graphical output will be displayed as follows:

Each error will correspond to a unique symbol or marker (diamond, hash, square, etc) and/or a unique color. The marker is visible when the entire chip is displayed. The user will have the option of making the marker flash. The user will be able to select which errors to view. He can select any combination of the existing errors. If more than one error exists in one location, the markers will not line up on top of one another—one error marker must not be buried or made invisible by another. A small displacement, enough to make all errors visible to the viewer, will be used. If the user moves the cursor over an error marker, a text description of the error will pop up (e.g., insufficient via array size, VDD/VSS short, unconnected VDD/VSS).

The errors will be saved in an error cell that can be recalled and overlaid on the top level routing cell. The display of missing elements (strap connections, via arrays, etc) will be in the form of the correct form of the error. For example, if the error is an insufficient via array, the proper via array will be displayed in the correct location. If a strap is of the wrong width, the error will be displayed as a strap in the proper location of the proper width. For errors such as R-layer to cell rail connections not intersecting the mesh but making direct contact to the cell rails, the error itself is all that need be displayed since the proper connection cannot necessarily be tied to the error in any meaningful way.

As stated above, a text error log is also created. The text error file may include the following:
Errors/warnings grouped by:
  1) By type
    memory/hardmac strap
    width/resistance
    vias
    slot/pad strap
    mesh
    standard cell rails
    opens/shorts
  2) By severity
    fatal error
    error
    warning
    informational warning Each listed error in a group may contain the following information:
  name of error/warning type
  location of error in x-y coordinates
  as appropriate, the correct value for the error
  sequential number of the error within the group An error summary section may also be listed that includes, the total number of errors of each type in each severity group, and the total number of errors in each error severity group. The error log file may contain any errors or warnings printed to the error screen, along with the standard log file information (date/time commenced, CPU time, tool revision, etc).

The Power Checker Database

Referring again to FIG. 3, as stated above, the power checker database 112 includes three interconnect components, the individual power elements 122 in the design, the location bins 124, and the connectivity graph 126. The power elements 122 represent all physical power structures from the layout database, plus a list of objects, such as net, layer, and cell instances.

In a preferred embodiment, the type of elements 122 stored in the database 112 include three property types: wires, vias, and pads. There are several types of wires, including core ring, mesh, memory strap, slot strap, pad strap, flip-chip, P/G ring, and standard cell rail. The checks of a type can be carried out only when certain types of elements 122 are present in the design. This dependency is described as follows.

Slot Strap Check: Depends on existence of core ring.
  Mesh Check: Depends on existence of core ring.
  Pad Strap Check: Depends on existence of core ring.
  Memory Strap Check: Depends on existence of mesh.
  Standard Cell Rail Check: Depends on existence of mesh.

The location bins 124 are a collection of lists that correspond to physical areas of the ASIC design, and each list includes pointers to the elements 122 that are located in the corresponding area or cross the boundary of the area.

Figure 8:
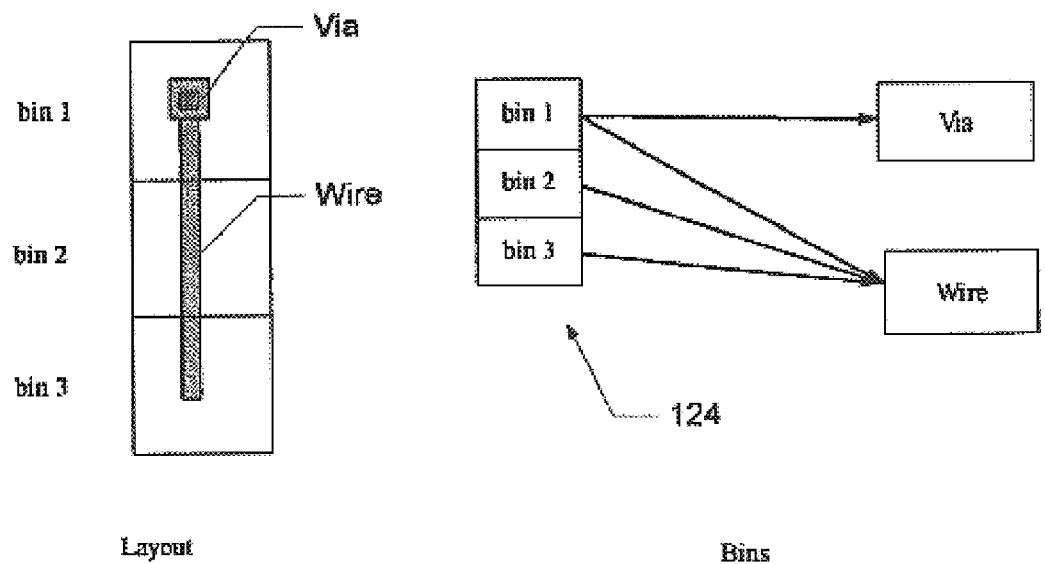
FIG. 8 is a diagram showing the relationship between elements in the physical layout design and their inclusion into corresponding location bins in the database.

FIG. 8 is a diagram showing the relationship between elements 122 in the physical layout design and their inclusion into corresponding location bins 124 in the database 112. The example shows three location bins (bins 1–3) that have been assigned to physical areas of a design, and two elements from the layout, a via and a wire, located in those areas. When the database 112 is loaded, bin 1 is provided with a pointer to the via, and bins 1–3 all have pointers to the wire because the wire crosses the boundaries of all three bins in the physical design.

The location bins 124 are to facilitate fast area searches. For example, to find all elements 122 to which a particular element 122 is connected, only the elements 122 in the bin 124 or bins 124 to which the element 122 belongs need to be checked. Therefore the database 112 significantly speeds up the analysis of the power checker modules 108. Ideally, the size of bins 124 should be such that the horizontal boundary of bins 124 coincide with cell rows so that standard cell rails are not vertically cut by multiple bins 124. One use of the location bins 124 is to create the connectivity graph 126.

Figure 9:
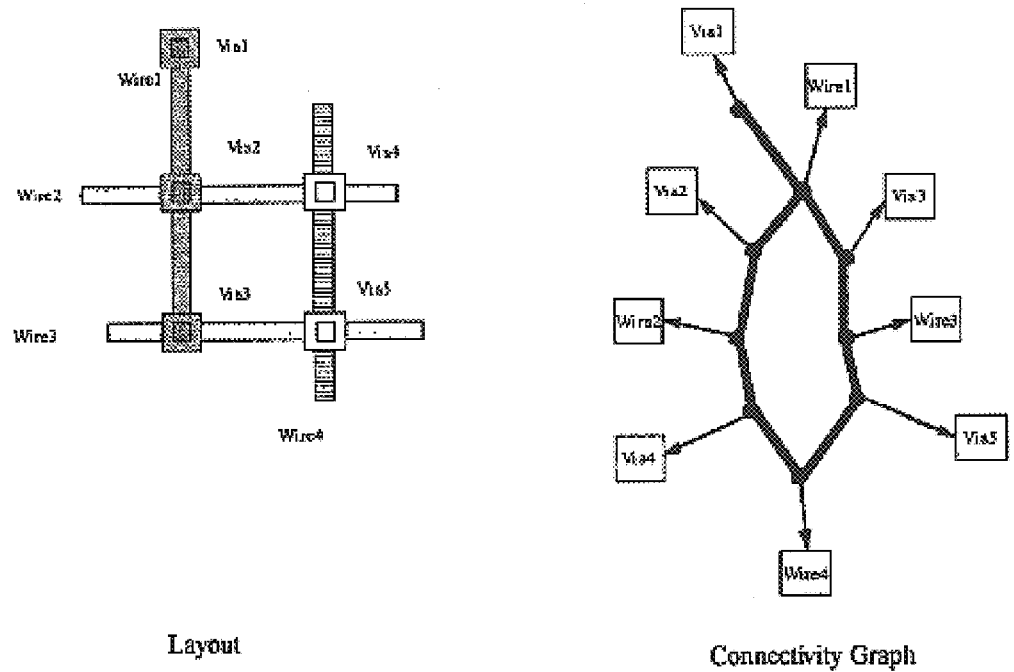
FIG. 9 is a diagram showing the relationship between elements in the physical layout design and their inclusion into the connectivity graph in the database.

FIG. 9 is a diagram showing the relationship between elements 122 in the physical layout design and their inclusion into the connectivity graph 126 in the database 112. An example section of the layout shows five vias and four wires interconnected. When the database 112 is populated from the layout database 118, the connectivity graph 126 would be created, as shown. The example connectivity graph 126 shows that via 1 is connected to wire 1, which is in turn connected to vias 2 and 3, and so on for each element in the layout.

The connectivity graph 126 may be built either fully or incrementally, as new elements 122 are added, or the existing elements 122 are deleted or modified. The graph 126 can be built partially for use in a partial power check (i.e., only to check if a memory strap pin is connected properly.) The building of the graph 126 may or may not be a multithreaded process. In one preferred embodiment, the connectivity graph is built using multithreading, where graphs for each bin are built and then merged into a final connectivity graph 126.

As stated above, the power checker modules 108, which access the database 112 to perform their analysis, are written in accordance with the design rules for power that are used to design the ASIC. FIG. 10 is a table showing a set of power design rules as an example of the principles on which the power checker modules 108 of the present invention are based upon. As those with ordinary skill in the art will recognize, however, the design rules for power are different from one feature size to the next, as the design rules cannot simply be ported from on feature size to another, e.g., 018 m to 0.11 m, because the rules do not scale linearly, In addition to being different for different feature sizes, the design rules may even be different for the same feature size at different foundaries used to fabricate the ASIC. Therefore, many other power design rules may be used to write the power checker modules 108.

Referring again to FIG. 6, the operational details of the power checker modules 108 are described below.

Core Ring Checker

The core ring checker 200 determines whether an adequate core-ring 60 has been created, i.e. that the width of the core-ring 60 is correct for the layer stack, technology, and specified current use in the design. The core ring checker 200 also checks to see whether the core-ring 60 uses the correct metal layers. In operation, the core ring checker 200 first identifies all core ring wires by their properties in the database 112. If no horizontal or verical wires exist, an error is issued. Next, the algorithm proceeds as follows:

1. Identify the correct layer for the vertical and horizontal wires from database 112 using the design's technology and layer stack.
2. Identify the correct width of the core ring wires from the database 112 using the design's technology, layer stack and frequency.
3. Compare each wire's width and layer with the correct values. Issue an error if there are discrepancies.
4. If two wires on different layers have an area of overlap, check that there are vias at the overlap, and that the number vias is a maximum possible for the area.
5. Check the connectivity of the core ring 60 to other elements, and issue an error if the core ring 60 connects directly to the die 62. Direct connection is considered the case when two elements are connected by a stack of vias only. Connection of the core ring 60 through other power elements, such as power mesh and slot straps is not considered direct.

The core ring checker 200 issues error in the following cases:

1. If the core-ring (vertical and horizontal) is not in the correct layers.
2. The width of the core ring is less than what is defined.
3. If mesh elements are missing (ring is not complete).
4. If the core-ring does not exist in the design a fatal error will be issued.

The core ring checker 200 issues warnings in situations where in a flip-chip design, the core ring 60 connects to the R Layer.

Slot Strap checker 202

In most ASICs, a slot strap must be and can only be connected to the core rings 60. More specifically, the slot straps on metal layers m1 and m2 must be fully extended from slot pins to the core ring; and the metals on layers m1 and m2 must be connected by fully populated via arrays. In addition, a balancing slot strap of an opposite net (power for ground or ground for power) must be present on either side of slot pin and connected from I/O ring to core ring. Thus, the slot strap checker 202 checks to see that the bottom layer slot strapping extends from the I/O ring to the appropriate VDD/VSS core ring, and issues an error if not.

In a preferred embodiment, the check is carried out by an algorithm called "Check Legal Connections". In general, the check legal connections algorithm checks if a power element connects to a legal destination by specifying all the legal elements to which it can be connected and by searching through searchable elements (which includes of the elements of its own type and vias) until either a legal or an illegal element is encountered. For slot staps, the search continues until one of the following conditions are met:

1) Core rings are encountered.
2) Power elements that are neither core rings nor slot straps are encountered.
3) No more new power elements can be searched.

If condition 1) is satisfied, the Slot Strap is connected correctly. If either condition 2) or 3) is met, then the slot strap is connected to an illegal destination or is floating and an error is issued.

Short Checker

The short checker 204 uses the connectivity graph 126 to check that no VSS/VDD shorts exist. For each short between VSS and VDD, an error will be issued. The short checker 204 can also be used to check for open connections by performing the following:

1. Check to see that all power/ground pins of macros are connected to an appropriate destination (no power/ground pins are left open/unconnected).

2. Check that all connections are made at appropriate intersections between power elements (no opens between core ring/mesh, i-ring/mesh, etc).
3. Check to see that there is no floating P/G element.
4. Check that no VSS/VDD shorts exist.

Mesh Bridge Checker

The mesh bridge checker 206 checks to see that an adequate mesh 64 has been created, i.e. that the width and pitch of the straps is correct for the amount of current in the design. The mesh bridge checker 206 preferably is able to support split wires also. The mesh bridge checker 206 algorithms proceeds as follows:

1. Identify the correct layer for the vertical and horizontal wires from database 112 using the design's layer stack and techonology
2. Identify the correct width of the mesh wires from the database 112 using design's technology, layer stack, and frequency.
3. Identify the mesh pitch from the database 112 using design's technbology and layer stack.
4. Identify all horizontal and vertical mesh wires, and identify all flip-chip wires.
5. Check that at all intersections between horizontal and vertical mesh wires are the maximum possible for the area of overlap.
6. Check that each mesh wire is on the correct layer, and because under certain conditions wires could be created in non-prefered routing direction, check that a wire is on one of the two allowed mesh layers.
7. For each mesh wire on correct layer check that its width is at least as much as identified in 2.
8. Check that the pitch between two adjacent vertical or horizontal wires is as maximum as the pitch identified in 3.
9. Check that each mesh wire terminates with connection to the correct power element. Correct termination is defined as the location of the start or end edge of the wire overlaps with another wire, and either the two wires are connected directly, or by via stack. The correct power elements for mesh termination are all ring type wires.
10. Check that vias exist between perpendicular mesh wires and flip-chip wires, and that the vias are of correct size.

For mesh bridges, check the following:
1. Based on the layer stack and corresponding layers used when creating the power mesh, determine if mesh bridges are needed.
2. Check if mesh bridges exist in the design.
3. Check if mesh bridges exist for each intersection of horizontal and vertical meshes with the same net.
4. Check if mesh bridge is correctly connected to the mesh.

The mesh checker issues errors in the following cases:
1. If the mesh is not in the correct layer.
2. If the mesh width is not correct for the given current.
3. If the mesh is non-uniform (pitch is not regular) or if mesh elements are missing.
4. If the mesh does not terminate at a core ring or I-ring or does not terminate as a pin (hierarchical block.).
5. If a mesh does not exist in the design (no structures with attribute mesh exist) a fatal error will be issued. The user will be prompted as to whether he wants to continue with other checks or abort the program Pad Strap Checker 208

Pad straps must be connected from power bond pads to the I/O ring 58 on the two most upper metal layers; and the metals on these layers must be connected by fully populated via arrays. Thus, the pad strap checker 208 checks to see that the top layer pad strapping extends from the pad edge to the appropriate VDD/VSS I/O ring and that it spans the width of the VDD or VSS I/O ring in the I/O cell.

The pad strap checker 208 issues errors in the following cases:
1. If the pad strap does not extend to the edge of the appropriate VDD/VSS IO ring.
2. All metal layers above the IORIng layers up to the top metal layer of the layer stack being used (metal 4 for 4lm, metal 5 for 3+2, metal 6 for 3+2+R, etc.) are connected by a fully populated array of vias. Check that all the pad straps are connected to the right ring(VDD to $vdd$, VSS to $vss$).
3. Any m1/m2 slot strap not connected to the core ring will result in an error.
4. For non-power I/O's the slot straps occur in pairs (i.e., VDD and VSS). The tool would issue an error message when the slot strap or the balancing slot strap does not exist or is not fully extended.
5. If no slot straps or pad straps exist, a fatal error will be issued and the user will be prompted whether he wants to continue with other checks.
6. For balancing slot straps check if connection exists.

Memory Strap Checker

The memory strap checker 210 checks to see that physical connectivity is made between straps and legal destination points. Legal destination points are defined as the legal destination points as determined by the design tool when routing the memory straps to power and ground. The memory strap checker 210 verifies the connectivity of power and ground pins to power sources. The power sources are defined as power mesh, flip-chip wires, core ring wires. The memory strap checker 210 algorithm proceeds as follows:

1. Identify the maximum length of a memory strap.
2. Identify all memories, hardmacros and hierarchical hard macros (HHMs).
3. For each cell, identify the t-strap and d-strap power and ground pins.
4. Determine the pin width from its outline. For d-strap pins it is the edge on the cell boundary, for t-strap pins, it is DX of the pins outline.
5. Trace the connectivy to the pin using a breadth-first-search algorithm, and verify that all pins are connected to a net.

The memory strap checker 210 issues errors in the following cases:
1. Straps are routed to a destination with attributes different than those defined by the functionality of the design tool.
2. Straps are left open and are not routed to anything.
3. Strap routing creates shorts between VDD and VSS.
4. t-straps are connected together instead of being routed directly to the proper destination point (mesh, R-layer, etc.).
5. Straps are connected to standard cell rails.
6. A memory pin does not have a net assigned to it.
7. A memory pin is not connected.

The memory strap checker 210 issues warnings in the following cases:

8. Straps are routed to an object with no attributes.
9. Straps do not have a minimum width, defined as the width of the power pin the strap is connecting to. If the strap is smaller than the power pin it connects, a warning will be issued.
10. An informational warning will be issued if the geometric length of wire on a t-strap is more than the pitch of the mesh (e.g., default is 200 um). The warning is informational only since without doing an actual power analysis, one can't determine if this is something that requires fixing. It is used as a warning to the user that a long wire exists.

In the event that memory strap checker 210 finds straps that have been incorrectly routed, the tool will indicate, graphically and in the text file, the location of the incorrect route. This can be a short, an open, an illegal destination, or a short across t-straps Standard Cell Rail Checker The standard cell rail checker 212 verifies the connectivity between all standard cell power/ground pins to metal layer 1 (m1) rails and also between m1 rails to other power elements, as well as the vias between m1 rails and power meshes. The standard cell rail checker 212 algorithm proceeds as follows:

1. Check to see that all of the standard cell power/ground connections have been made. If a connection is missing, an error will be issued.
2. In any case where the standard cell rail connects directly to a flip-chip layer (bypassing the mesh) an error will be issued.
3. In any case where the standard cell rails connect to hardmac rings/pins, an error will be issued.
4. Check to see that no power shorts exist between the standard cell power/ground connections and the mesh. In the event that shorts are found, an error will be issued.
5. Check if the power/ground pins of all the standard cells are connected by M1 rails.
6. Check if all the rails connect to the mesh.
7. The m1 rail should terminate only on a core ring, I/O ring or mesh or extend to the boundary and generate pins (hierarchical).
8. If standard cell rails do not exist, a fatal error will be issued and the user will be prompted as to whether he wants to continue with other checks.

Via Checker

The via checker 214 checks to see that the proper number of vias has been dropped in each power connection (mesh/mesh, mesh/standard cell rail, mesh/core ring, mesh/Iring, mesh/t-straps, and so on). The via checker 214 operates as follows:

1. Check that intersections between mesh/core ring/i-ring straps (intersections between different or like strap types) are fully populated by vias. If the intersection is not fully populated, an error will be issued.
2. Intersections between t/d-straps and mesh/R-layer are fully populated by vias that would occupy a square area equal to the square of the width of the strap.
3. The minimum number of vias to be used in the special via rule for producing vias for standard cell power/ground routing to the mesh is determined by a library. The standard cell rail connections to mesh will be checked as well as bridges created to avoid shorts between VDD and VSS. If fewer vias are found for standard cell P/G rail connections, an error will be issued.
4. For flip-chip designs, check to see that the mesh connects to a flip-chip layer. The intersection of the flip-chip layer and the mesh should be fully populated.

It should be understood that the type of power check modules 108 described above are illustrative and many other types of checks could be included. For example, a flip-chip checker could be included to analyze flip-chip designs. The flip-chip checker may check that flip-chip wires are connected to the I/O core rings in the area where the wires overlap with the IOs. The algorithm could proceed as follows:

1. Identify all IO cells in a design.
2. Identify all wires that belong to the flip-chip structures and overlap with any IO cell.
3. Identify all wires that belong to the flip-chip structures and overlap with IO Ring wires.
4. Trace the connection from each flip-chip wire from 2 and 3 only through vias or wires form the same list. This way, the connection is not traced through the flip-chip wires over the core region.
5. Trace completes sucessfully if connection to I/O pin or I/O ring wire is detected. If the trace does not reach I/O pin or I/O ring wire error is issued.

A method for checking power errors in ASIC designs has been disclosed. The present invention has been described in accordance with the embodiments shown, and one of ordinary skill in the art will readily recognize that there could be variations to the embodiments, and any variations would be within the spirit and scope of the present invention. In addition, software written according to the present invention may be stored on a computer-readable medium, such as a removable memory, or transmitted over a network, and loaded into a computer for execution. Accordingly, many modifications may be made by one of ordinary skill in the art without departing from the spirit and scope of the appended claims.

What is claimed is:

1. A computer-implemented method for checking power errors in an ASIC design, the method comprising the steps of:
   (a) providing a power checker software program with one or more power checker modules that check different types of power elements in the ASIC design;
   (b) creating a database that stores interconnect components including individual power elements in the ASIC design, a connectivity graph of the power elements, and location bins corresponding to physical areas in ASIC design that identify the power elements that are located within each area;
   (c) providing a user a choice of which power elements to check;
   (d) executing the power checker modules corresponding to the selected power elements to check for errors in the selected power elements; and
   (e) outputting any detected errors for the user.

2. The method of claim 1 wherein the ASIC design is based on a set of design rules, step (a) further including the step of: deriving the power checker modules from the set of design rules.

3. The method of claim 1 wherein step (a) further includes the step of: using each of the power checker modules to analyze a particular type of power element.

4. The method of claim 1 wherein step (b) further includes the step of: creating the database from a layout database.

5. The method of claim 4 wherein step (b) further includes the step of: creating the database when the power checker software is invoked.

6. The method of claim 1 wherein step (c) further includes the step of: displaying a list of available power checks for user selection.

7. The method of claim 6 wherein step (c) further includes the step of: allowing the user to perform checks on all types of power elements, or any combination of the following: check shorts, check slot straps, check mesh, check pad straps, check memory straps, check rails, and check via.

8. The method of claim 6 wherein step (c) further includes the step of: requiring that the user specify a value for a current and a frequency prior to running the power checks.

9. The method of claim 1 wherein step (a) further includes the step of: providing the power checker software program with a plurality of power checker modules including, a core ring checker, a slot strap checker, a short checker, a mesh checker, a pad strap checker, a memory straps checker, a standard cell rail checker, and a via checker.

10. The method of claim 1 wherein step (b) further includes the step of: providing the elements in the database as three property types; wires, vias, and pads, wherein the wires have multiple types including core ring, mesh, memory strap, slot strap, pad strap, flip-chip, P/G ring, and standard cell rail.

11. The method of claim 1 wherein step (b) further includes the step of: using the location bins to perform fast area searches by the power checker modules.

12. The method of claim 1 wherein step (b) further includes the step of: sizing the location bins such that a horizontal boundary the bins coincides with cell rows.

13. The method of claim 1 wherein step (b) further includes the step of: using the location bins to generate the connectivity graph.

14. The method of claim 1 wherein step (b) further includes the step of: building the connectivity graph either fully or incrementally, as new elements are added, and as existing elements are deleted or modified.

15. The method of claim 1 wherein step (b) further includes the step of: building the connectivity graph using multithreading, where connectivity graphs for each location bin are built and then merged into a final connectivity graph.

16. The method of claim 1 wherein step (e) further includes the step of: displaying an error screen having a scrollable list of the errors and warnings issued by the respective power checker modules.

17. The method of claim 16 wherein step (e) further includes the step of: providing a description and severity for a currently selected error.

18. The method of claim 16 wherein step (e) further includes the step of: displaying the errors graphically to visually aid the user in finding errors physically on the ASIC.

19. The method of claim 9 wherein the core ring checker performs the steps of:
(a) identifying a correct layer for vertical and horizontal wires using the ASIC design's technology and layer stack from the database,
(b) identifying a correct width of core ring wires using the design's technology, layer stack and frequency,
(c) comparing each wire's width and layer with correct values, and issuing an error if there are discrepancies,
(d) If two wires on different layers have an area of overlap, checking that there are vias at the overlap, and that a number of vias is a maximum possible for the area, and
(e) checking the connectivity of the core ring to other elements, and issuing an error if the core rings connects directly to a die.

20. The method of claim 9 wherein the slot strap checker performs the steps of:
(a) checking if each power element connects to legal destination by specifying all legal elements to which each type of power element can be connected and searching through searchable elements, which includes elements of a same type and vias, until either a legal or an illegal element is encountered; for slot straps, continuing the search until one of the following conditions are met:
(i) core rings are encountered,
(ii) power elements that are neither core rings nor slot straps are encountered,
(iii) no more new power element can be searched,
(b) determining that if condition (i) is satisfied, the slot strap is connected correctly, and
(c) If either condition (ii) or (iii) is met, determining that the slot strap is connected to an illegal destination or is floating and issuing an error.

21. The method of claim 9 wherein the slot strap checker performs the steps of:
(a) checking to see that all power/ground pins of macros are connected to an appropriate destination;
(b) checking that all connections are made at appropriate intersections between power elements;
(c) checking to see that there is no floating power/ground element; and
(d) checking that no VSS/VDD shorts exist.

22. The method of claim 9 wherein the mesh bridge checker performs the steps of:
(a) identifying a correct layer for the vertical and horizontal wires from database using the ASIC design's layer stack and techonology;
(b) identifying a correct width of the mesh wires from the database using the design's technology, layer stack, and frequency;
(c) identifying a mesh pitch from the database using design's technbology and layer stack;
(d) identifying all horizontal and vertical mesh wires, and identify all flip-chip wires;
(e) checking that at all intersections between horizontal and vertical mesh wires are the maximum possible for the area of overlap;
(f) checking that each mesh wire is on a correct layer, and checking that a wire is on one of the two allowed mesh layers;
(g) for each mesh wire on the correct layer, check that its width is at least as much as identified in step (b);
(h) checking that the pitch between two adjacent vertical or horizontal wires is as maximum as the pitch identified in step (c);
(i) checking that each mesh wire terminates with connection to the correct power element;
(j) checking that vias exist between perpendicular mesh wires and flip-chip wires, and that the vias are of correct size; and
(k) for mesh bridges, performing the steps of:
(i) based on the layer stack and corresponding layers used when creating the power mesh, determining if mesh bridges are needed,
(ii) checking if mesh bridges exist in the design,
(iii) checking if mesh bridges exist for each intersection of horizontal and vertical meshes with a same net, and (iv) checking if mesh bridge are correctly connected to the mesh.

23. The method of claim 9 wherein the pad strap checker performs the steps of:
   (a) checking that top layer pad strapping extends from a pad edge to an appropriate VDD/VSS I/O ring; and
   (b) checking that the top layer pad strapping spans the width of the VDD or VSS I/O ring in an I/O cell.

24. The method of claim 9 wherein the memory strap checker performs the steps of:
   (a) identifying a maximum length of a memory strap;
   (b) identifying all memories, hardmacros and hierarchical hard macros;
   (c) for each cell, identifying all t-strap and d-strap power and ground pins;
   (d) determining pin widths; and
   (e) tracing connectivy to each pin using a breadth-first-search algorithms, and verifying that all pins are connected to a net.

25. The method of claim 9 wherein the standard cell rail checker performs the steps of:
   (a) checking to see that all of standard cell power/ground connections have been made, and issuing an error if a connection is missing;
   (b) in any case where a standard cell rail connects directly to a flip-chip layer, issuing an error;
   (c) in any case where the standard cell rails connect to hardmac rings/pins, issuing an error;
   (d) checking to see that no power shorts exist between standard cell power/ground connections and the mesh, and if a short is found, issuing an error;
   (e) checking if the power/ground pins of all the standard cells are connected by M1 rails;
   (f) checking if all the rails connect to the mesh;
   (g) checking that the m1 rail terminates only on a Core Ring, I/O Ring, or mesh or extends generate pins; and
   (h) If standard cell rails do not exist, issuing a fatal error.

26. The method of claim 9 wherein the standard cell rail checker performs the steps of:
   (a) checking that intersections between mesh/core ring/i-ring straps are fully populated by vias, and issuing an error if the intersection is not fully populated;
   (b) checking that intersections between t/d-straps and mesh/R-layer are fully populated by vias that would occupy a square area equal to the square of the width of the strap;
   (c) checking standard cell rail connections to mesh as well as bridges created to avoid shorts between VDD and VSS, and if fewer vias are found for standard cell P/G rail connections, issuing an error; and
   (d) for flip-chip designs, checking that the mesh connects to a flip-chip layer and that the intersection of the flip-chip layer and the mesh is fully populated.

27. A computer-readable medium containing program instructions for checking power errors in an ASIC design, the program instructions for:
   (a) providing a power checker software program with one or more power checker modules that check different types of power elements in the ASIC design;
   (b) creating a database that stores interconnect components including individual power elements in the ASIC design, a connectivity graph of the power elements, and location bins corresponding to physical areas in ASIC design that identify the power elements that are located within each area;
   (c) providing a user a choice of which power elements to check;
   (d) executing the power checker modules corresponding to the selected power elements to check for errors in the selected power elements; and
   (e) outputting any detected errors for the user.

28. The computer-readable medium of claim 27 wherein the ASIC design is based on a set of design rules, instruction (a) further including the instruction of: deriving the power checker modules from the set of design rules.

29. The computer-readable medium of claim 27 wherein instruction (a) further includes the instruction of: using each of the power checker modules to analyze a particular type of power element.

30. The computer-readable medium of claim 27 wherein instruction (b) further includes the instruction of: creating the database from a layout database.

31. The computer-readable medium of claim 30 wherein instruction (b) further includes the instruction of: creating the database when the power checker software is invoked.

32. The computer-readable medium of claim 27 wherein instruction (c) further includes the instruction of: displaying a list of available power checks for user selection.

33. The computer-readable medium of claim 32 wherein instruction (c) further includes the instruction of: allowing the user to perform checks on all types of power elements, or any combination of the following: check shorts, check slot straps, check mesh, check pad straps, check memory straps, check rails, and check via.

34. The computer-readable medium of claim 32 wherein instruction (c) further includes the instruction of: requiring that the user specify a value for a current and a frequency prior to running the power checks.

35. The computer-readable medium of claim 27 wherein instruction (a) further includes the instruction of: providing the power checker software program with a plurality of power checker modules including, a core ring checker, a slot strap checker, a short checker, a mesh checker, a pad strap checker, a memory straps checker, a standard cell rail checker, and a via checker.

36. The computer-readable medium of claim 27 wherein instruction (b) further includes the instruction of: providing the elements in the database as three property types; wires, vias, and pads, wherein the wires have multiple types including core ring, mesh, memory strap, slot strap, pad strap, flip-chip, P/G ring, and standard cell rail.

37. The computer-readable medium of claim 27 wherein instruction (b) further includes the instruction of: using the location bins to perform fast area searches by the power checker modules.

38. The computer-readable medium of claim 27 wherein instruction (b) further includes the instruction of: sizing the location bins such that a horizontal boundary the bins coincides with cell rows.

39. The computer-readable medium of claim 27 wherein instruction (b) further includes the instruction of: using the location bins to generate the connectivity graph.

40. The computer-readable medium of claim 27 wherein instruction (b) further includes the instruction of: building the connectivity graph either fully or incrementally, as new elements are added, and as existing elements are deleted or modified.

41. The computer-readable medium of claim 27 wherein instruction (b) further includes the instruction of: building the connectivity graph using multithreading, where connectivity graphs for each location bin are built and then merged into a final connectivity graph.

42. The computer-readable medium of claim 27 wherein instruction (e) further includes the instruction of: displaying an error screen having a scrollable list of the errors and warnings issued by the respective power checker modules.

43. The computer-readable medium of claim 16 wherein instruction (e) further includes the instruction of: providing a description and severity for a currently selected error.

44. The computer-readable medium of claim 16 wherein instruction (e) further includes the instruction of: displaying the errors graphically to visually aid the user in finding errors physically on the ASIC.

45. A computer-implemented method for checking power errors in an ASIC design, the method comprising the steps of:
   (a) creating a database for storing ASIC design information, the ASIC design information including,
      (i) individual power elements in the ASIC design,
      (ii) a connectivity graph indicating the power elements to which of the power elements are connected, and
      (iii) location bins corresponding to physical areas in ASIC design that identify the power elements that are located within each area; and
   (b) creating a plurality of power checker modules that access the database to analyze the ASIC design for power errors.

46. The method of claim 45 further including the steps of:
   (c) allowing a user to run the power checker modules individually, in combination, or all at once; and
   (d) outputting any detected errors.

47. The method of claim 46 wherein step (a) further includes the step of: providing the power elements in the database as three property types; wires, vias, and pads, wherein the wires have multiple types including core ring, mesh, memory strap, slot strap, pad strap, flip-chip, P/G ring, and standard cell rail.

48. The method of claim 47 wherein step (b) further includes the step of: using the location bins to perform fast area searches by the power checker modules.

49. The method of claim 48 wherein step (a) further includes the step of: sizing the location bins such that a horizontal boundary the bins coincides with cell rows.

50. The method of claim 49 wherein step (a) further includes the step of: using the location bins to generate the connectivity graph.

51. The method of claim 50 wherein step (a) further includes the step of: building the connectivity graph either fully or incrementally, as new elements are added, and as existing elements are deleted or modified.

52. The method of claim 51 wherein step (a) further includes the step of: building the connectivity graph using multithreading, where connectivity graphs for each location bin are built and then merged into a final connectivity graph.

53. A computer-readable medium containing program instructions for checking power errors in an ASIC design, the program instructions for:
   (a) creating a database for storing ASIC design information, the ASIC design information including,
      (i) individual power elements in the ASIC design,
      (ii) a connectivity graph indicating the power elements to which of the power elements are connected, and
      (iii) location bins corresponding to physical areas in ASIC design that identify the power elements that are located within each area; and
   (b) creating a plurality of power checker modules that access the database to analyze the ASIC design for power errors.

54. The computer-readable medium of claim 53 further including the instructions of:
   (c) allowing a user to run the power checker modules individually, in combination, or all at once; and
   (d) outputting any detected errors.

55. The computer-readable medium of claim 54 wherein instruction (a) further includes the instruction of: providing the power elements in the database as three property types; wires, vias, and pads, wherein the wires have multiple types including core ring, mesh, memory strap, slot strap, pad strap, flip-chip, P/G ring, and standard cell rail.

56. The computer-readable medium of claim 55 wherein instruction (b) further includes the instruction of: using the location bins to perform fast area searches by the power checker modules.

57. The computer-readable medium of claim 56 wherein instruction (a) further includes the instruction of: sizing the location bins such that a horizontal boundary the bins coincides with cell rows.

58. The computer-readable medium of claim 57 wherein instruction (a) further includes the instruction of: using the location bins to generate the connectivity graph.

59. The computer-readable medium of claim 58 wherein instruction (a) further includes the instruction of: building the connectivity graph either fully or incrementally, as new elements are added, and as existing elements are deleted or modified.

60. The computer-readable medium of claim 59 wherein instruction (a) further includes the instruction of: building the connectivity graph using multithreading, where connectivity graphs for each location bin are built and then merged into a final connectivity graph.

* * * * *